US012792940B2

(12) United States Patent
DiLuoffo

(10) Patent No.: US 12,792,940 B2
(45) Date of Patent: Nov. 10, 2026

(54) TARGET APPLICATION PROFILE FOR QUANTUM COMPUTING

(71) Applicant: Vincenzo DiLuoffo, Sandy Hook, CT (US)

(72) Inventor: Vincenzo DiLuoffo, Sandy Hook, CT (US)

(73) Assignee: Vincenzo DiLuoffo, Sandy Hook, CT (US)

(*) Notice: Subject to any disclaimer, the term of this patent is extended or adjusted under 35 U.S.C. 154(b) by 777 days.

(21) Appl. No.: 18/061,730

(22) Filed: Dec. 5, 2022

(65) Prior Publication Data

US 2024/0185107 A1 Jun. 6, 2024

(51) Int. Cl.
*G06N 10/80* (2022.01)
*G06N 10/20* (2022.01)

(52) U.S. Cl.
CPC ............. *G06N 10/20* (2022.01); *G06N 10/80* (2022.01)

(58) Field of Classification Search
None
See application file for complete search history.

(56) References Cited

U.S. PATENT DOCUMENTS 11,539,347 B1 * 12/2022 Chakraborty .......... H03H 11/24
2020/0201655 A1 * 6/2020 Griffin .................. G06F 9/4494
2021/0273792 A1 * 9/2021 Coady .................... H04L 9/0819
2022/0084085 A1 * 3/2022 Rigetti .............. H04M 15/8214
2022/0321953 A1 * 10/2022 Tapse ............... H04N 21/26603
2024/0070735 A1 * 2/2024 Gallagher .............. G06Q 30/04
2024/0119329 A1 * 4/2024 Dou .......................... G06F 8/41

FOREIGN PATENT DOCUMENTS

WO WO-2022232604 A1 * 11/2022 ............. G06N 10/60

OTHER PUBLICATIONS

Pérez-Castillo et al., "Design of classical-quantum systems with UML", Computing 104, 2375-2403 (2022).
Web Archive, "Target Profile Types in Azure Quantum," (URL), Microsoft Learn, Nov. 12, 2022 (last accessed by Internet Archive, Feb. 4, 2023).

* cited by examiner

*Primary Examiner* — Xuyang Xia
(74) *Attorney, Agent, or Firm* — Foley Hoag LLP; Erik A. Huestis; Joshua S. Matloff

(57) ABSTRACT

Systems, methods, and computer program products are provided for facilitating quantum computing in a distributed environment. In various embodiments, an application execution request that includes an application logic and an application profile indicating at least one quantum computing resource requirement is received from a requestor. At least one quantum computing resource requirement is compared against a plurality of quantum processing units to confirm that the at least one quantum computing resource requirement is met by the plurality of quantum processing units. An execution set of the plurality of quantum processing units is selected and application logic is assigned for execution on the execution set.

16 Claims, 3 Drawing Sheets

100

200

TARGET APPLICATION PROFILE FOR QUANTUM COMPUTING

BACKGROUND

Embodiments of the present disclosure relate to systems, methods, and computer program products for efficient resource utilization in a distributed quantum environment.

BRIEF SUMMARY

According to embodiments of the present disclosure, methods and computer program products for facilitating quantum computing in a distributed environment are provided. Frameworks according to the present disclosure use an application profile to distribute and/or assign applications and processes to computing resources in a distributed quantum computing environment. For example, using the techniques described herein, quantum computing resources can be accessed by client devices. The client devices can be classical computing devices that may seek to take advantage of the speed of quantum computing for solving problems. A user can submit a request for executing an application by a quantum computer. The request can include an application profile that includes a list of one or more computing requirements, including quantum computing resources, that are required to perform one or more operations of the application. Embodiments of the present disclosure, methods and computer program products can be implemented to operate with different cryogenic complementary metal-oxide semiconductor (cyro-CMOS) control system as a scalable solution to quantum computers with large number of qubits. The methods and computer program products of the present disclosure can also be provided as a tool for various quantum development platforms that can be used to build quantum programs and experiments.

The request is transmitted over a network to a distributed quantum computing environment where the task of executing the application is assigned to a quantum computer of the distributed quantum computing environment based on the requirements specified by the application profile. The distributed quantum computing environment can include a resource manager that can use the application profile to select appropriate computing resources, schedule tasks and processes based on available resources, update an inventory of computing resources available in the distributed environment, and otherwise perform intelligent management of computing resources.

In various embodiments, a method is provided that includes receiving from a requestor via a network interface an application execution request comprising application logic and an application profile comprising an indication of at least one quantum computing resource requirement. In various embodiments at least one quantum computing resource requirement is compared against a plurality of quantum processing units to confirm that the at least one quantum computing resource requirement is met by the plurality of quantum processing units. In various embodiments an execution set of the plurality of quantum processing units is selected that collectively meet the at least one quantum computing resource requirement. In various embodiments a validation message is provided to the requestor. In various embodiments, the application logic is assigned for execution on the execution set.

In various embodiments, assigning the application logic for execution includes compiling the application logic into qubit logic.

In various embodiments, the methods further include encrypting the qubit logic, transmitting the encrypted qubit logic to the execution set and decrypting the encrypted qubit logic for execution at the execution set.

In various embodiments, the methods further includes a scaled number of dilution refrigerators according to the number of qubits, and/or a number of gates. In various embodiments, at least one of the plurality of quantum processing units executes the qubit logic using the qubits of at least one of the scaled number of dilution refrigerators.

In various embodiments, the application execution request further includes application data. In various embodiments, the application logic includes a plurality of instructions or a plurality of software modules. In various embodiments, the application profile further includes a name, version, and/or description. In various embodiments, the application profile further includes cryptographic information operative to decrypt the application logic.

In various embodiments, at least one quantum computing resource requirement includes a minimum number of qubits, a qubit type, and/or a number of gates.

In various embodiments, the application execution request is encrypted, and the method further includes decrypting the application execution request.

DETAILED DESCRIPTION

Figure 1:
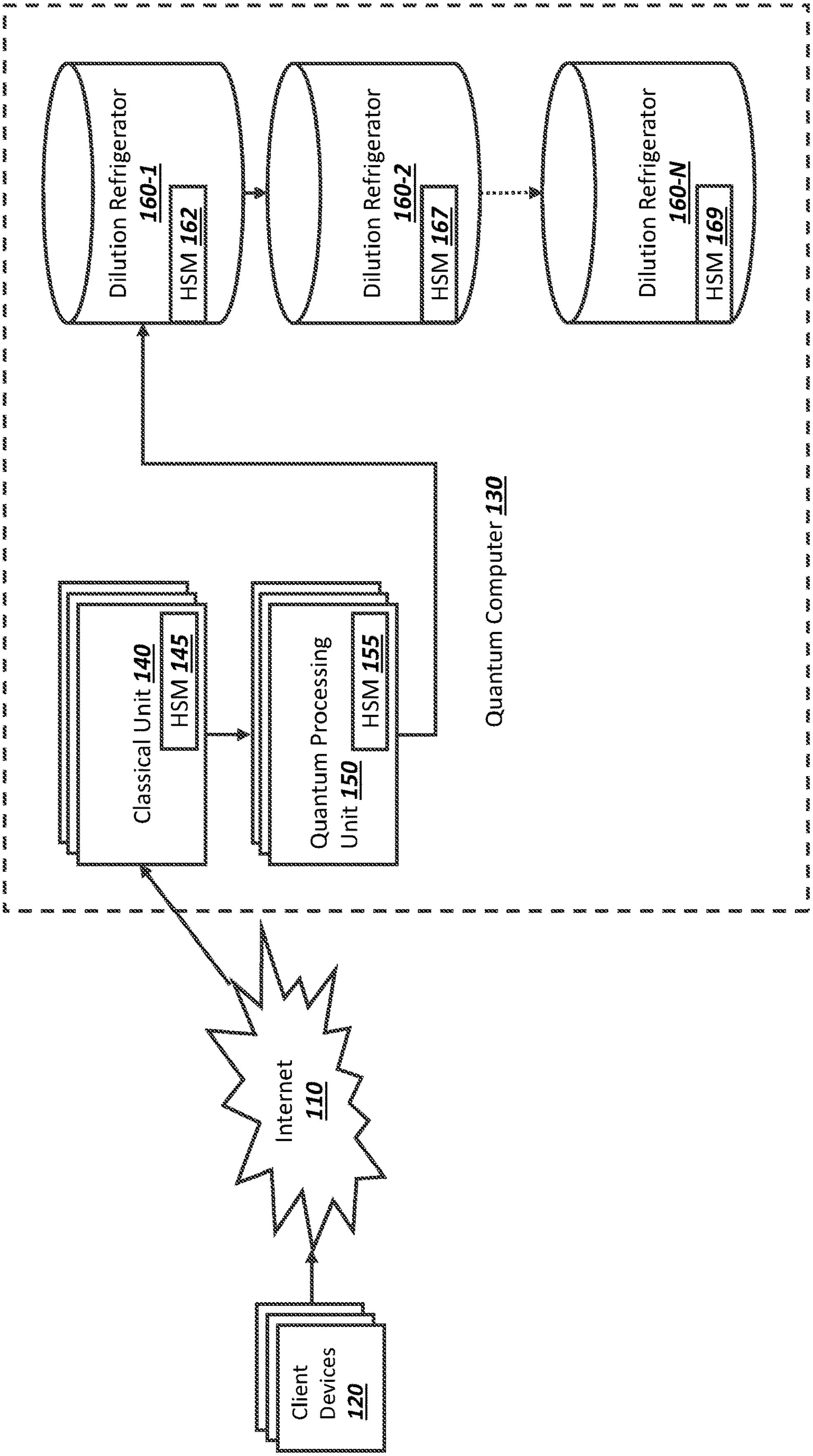
FIG. 1 is a block diagram of an example hybrid quantum computer according to embodiments of the present disclosure.

Quantum computers use quantum mechanical properties of superposition, entanglement, and interference to perform desired computations. Quantum computers are fundamentally different from classical computers in that quantum computers use qubits and classical computers use transistors. Classical/traditional computers use classical bits (also referred to as just bits) to store information where each bit is 0 or 1 at any given time. In contrast, quantum computers use qubits (quantum digit) to store information that can occupy two distinct states labeled $|0\rangle$ and $|1\rangle$, or any quantum superposition of the two states.

The term qubit denotes the unit of quantum information that can be realized in suitable d-level quantum systems. A collection of qubits that can be measured to N states can implement an N-level qubit. In various applications, multiple qubits are entangled to build multi-qubit quantum gates. Quantum bits are encoded in quantum systems with two (or more) distinct quantum states. There are many physical realizations that may be employed. One example is based on individual particles such as atoms, ions, or molecules which are isolated in vacuum. These isolated atoms, ions, and molecules have many distinct quantum states that correspond to different orientations of electron spins, nuclear spins, electron orbits, and molecular rotations/vibrations.

Today's quantum computing systems execute small application logic that is constructed from logic gates and supported by a limited number of qubits. However, more meaningful applications will require larger number of qubits. As more and more research is undertaken in this field, quantum computing will scale to hundreds of qubits, thereby allowing varied and more complex applications to execute. For example, advances in dilution refrigerators can result in increase in the number of qubits per dilution refrigerators and including multiple dilution refrigerators can further increase the total number of qubits used by the quantum computer. Scaling with regard to quantum computing also refers to qubit connectivity, which is a measure of how many qubits can each qubit interact with. For example, if a quantum computer has n qubits and each qubit can interact directly with each of the other qubits, then the connectivity measure n−1. As another example, if a qubit can only interact directly with one other qubit, then the connectivity is 1.

Other methods of building larger and more powerful quantum computers can include networking multiple quantum computers and classical computers. Since quantum computing is in its infancy and since quantum computing resources can be rare, expensive, or maybe even inaccessible due to certain limitations, classical computers can be used alongside quantum computers. Such a mode of operation is referred to as hybrid quantum computing where a quantum computer and a classical computer work together to solve a problem. Further scaling can result in decentralizing the computing system and connecting computing resources that are distributed geographically resulting in a distributed quantum computing environment.

A distributed quantum computer has its own challenges. For example, distributed systems are often heterogenous because of the difference in networks, programming languages, computing hardware, operating systems, and differences in software implementation. A distributed quantum computer should also ensure concurrency to allow the shared access of resources which must be made available to the correct processes. A distributed quantum computer should also be able handle failures. With so many users, applications, and processes a distributed quantum computer is bound to have failures at different times. Failures can occur in the software, hardware, and in the network resulting in a partial failure causing some components to function and other to not. Other issues include resource management, security and privacy, quality of service (QOS), synchronization, etc. that are known in the art.

The present disclosure provides systems and methods for facilitating quantum computing in a distributed environment. Frameworks provided herein use an application profile to distribute and/or assign applications and processes to computing systems in a distributed quantum computing environment. For example, using the techniques described herein, quantum computing resources can be accessed by client devices. The client devices can be classical computing devices that may seek to take advantage of the speed of quantum computing for solving problems. A user can submit a request for executing an application by a quantum computer. The request can include an application profile describing the application requirements. The request may be transmitted over a network to a distributed quantum computing environment where the task of executing the application is assigned to a quantum computer of the distributed quantum computing environment based on the requirements specified by the application profile.

The application profile can include a list of one or more computing requirements, including quantum computing resources, that are required to perform one or more operations of the application. The computing resources are selected based on the computing requirements specified by the application profile. In some embodiments, the distributed quantum computing environment can include a resource manager that can use the application profile to select appropriate computing resources, schedule tasks and processes based on available resources, update an inventory of computing resources available in the distributed environment and otherwise perform intelligent management of computing resources. The methods, system and computer program products of the present disclosure can be implemented to operate with different cryogenic complementary metal-oxide semiconductor (cyro-CMOS) control system as a scalable solution to quantum computers with large number of qubits. The methods, system and computer program products of the present disclosure can also be provided as a tool for various quantum development platforms that can be used to build quantum programs and experiments.

FIG. 1 is a block diagram of an example environment implementing a distributed hybrid quantum computer. The example environment 100 includes a network 110, such as a local area network (LAN), a wide area network (WAN), the Internet, or a combination thereof connecting one or more client devices 120 to the hybrid quantum computer 130.

A client device 120 is an electronic device of a user that can request and receive data over the network 110. Example client device 120 include personal computers, tablet computers, mobile communication devices (e.g., smartphones), televisions, set top boxes, personal digital assistants and other devices that can send and receive data over the network 110. A client device 120 typically includes one or more user applications to facilitate the sending and receiving of data over the network 110.

The hybrid quantum computer 130 is a distributed quantum computer that includes multiple classical units (CU) 140, which are connected via the network 110. The CU 140 are any non-quantum computer such as a classical computer. The hybrid quantum computer 130 also includes multiple quantum processing units (QPU) 150, which are computational units that use quantum computing principles to perform a task. The QPU 150 are further connected to multiple dilution refrigerators that house multiple qubits needed for quantum computation. In the example provided with reference to FIG. 1, the QPU 150 are connected to N dilution refrigerators 160-1 to 160-N. Each dilution refrigerator 160-1 to 160-N can include a hardware security module (HSM) that are trusted physical devices that provide data protection by generating keys, encrypting, and decrypting data, and creating and verifying digital signatures. For example, dilution refrigerator 160-1, 160-2 and 160-N includes HSM 162, 167 and 169 respectively.

For purpose of illustration (and not limitation), the following description has been explained with reference to dilution refrigerators 160-1 and 160-2. It will be appreciated that in various embodiments, different numbers of CU, QPU, and dilution refrigerators may be employed.

In some embodiments, the client device 140 can generate and transmit a request for executing an application and/or a process on a quantum computer. The request can be transmitted over the network 110 to the hybrid quantum computer 130. In some embodiments, the request can include application logic. Application logic can include a set of instructions, or a set of modules or procedures, that allow for a certain type of computing operation. Application logic can also include a step-by-step procedure such as an algorithm to perform a computation where each step can be performed on a computer. In some embodiments, the application logic can also include application data required for the computing operation. For example, if the application logic provides instructions to compute factors of any given integer, the application data can be the integer for which the factors have to be computed.

In some embodiments, the request can include an application profile that is specific to the application logic. As discussed earlier, the application profile can include a list of one or more computing requirements, including quantum computing resources needed to execute the application logic. For example, the application profile can include the name of the application, the version of the application, a description of the application, and one or more resources and their types needed to execute the application logic. The following are some of the computing application profile components.

Application Name: This is the name of the application that the client 120 wants to execute on the quantum computer. This can also include details of the creator of the application including one or more third party vendors that have licensed the application from the creator of the application.

Application Version: This refers to the version of the application that the client 120 wants to execute on the quantum computer.

Application Description: This refers to one or more features of the application that the client 120 wants to execute on the quantum computer.

Application Type: This refers to the type of the application that the client 120 wants to execute on the quantum computer. In some embodiments, this is used for prioritization of application execution, or for categorization of the application in user output.

Qubit Type: This refers to the kind of qubit to be used for execution. For example, a given application may require a neutral atom, trapped ion, or superconducting qubit.

Resources needed to run application logic: This includes a list of all special equipment needed to execute application logic. For example, additional sensors or measurement components may be required to execute certain applications.

Number of Gates: This refers to the total number of gates required to execute the quantum circuits contained in a given application.

Application logic type: this includes an indication of whether the application logic is static or dynamic. In static application logic, classical logic is not performed within the coherence time of the qubits. Dynamic quantum circuits are circuits in which measurements can be performed in the middle of the circuit and the measurement results are then used to control some quantum gates to be applied afterwards.

Protection: This refers to a flag indicating whether execution protection should be enabled. In addition, this may include one or more additional fields containing the cryptographic components necessary to provide execution protection, such as: a Key Identifier, Key Usage Type, Algorithm identifier, Key length, Certificate Type, and/or Certification identifier.

Processing time estimate: This indicates an estimate of the classical and/or quantum processing time required by the application. In some embodiments this can include multiple time estimates based on different resource configurations.

Characteristics of qubits: This indicates additional requirements of the qubits for the execution of the application. For example, (i) T1 time: This refers to the time duration of loss of energy of a qubit. This is also referred to as relaxation time.

(ii) T2 time: This refers to how long the phase information is preserved in a qubit. This is also referred to as coherence time.

(iii) Error correction levels [10^−3, 10^−4, 10^−5, and etc.]: This refers to the number of times a qubit operation has errors. For example, an error correction level of 10^−3 would mean that one in a thousand qubit operations will have errors.

(iv) Benchmark attributes (Volume, CPLOPS and etc.) This indicates the benchmark performance values of the 1 or 2 qubit tests.

(v) Minimum number of qubits needed to run the application. This information can be used for processing and scheduling one or more processes of the qubit application logic.

(vi) A restriction on number of hopes within a set of refrigerators in a distributed topology.

(vii) Read out results: This refers to a flag that can indicate whether the output data is protected (via for e.g., encryption). It can also include one or more parameters to indicate the encryption standard including the algorithms used for protecting the data.

Although this disclosure describes the contents of the application profile using the above-mentioned parameters, the application logic can include any information that indicates the characteristics or specifications of the application and/or application logic.

In some embodiments, the client device 120 can encrypt the request that includes the application logic and the application profile to ensure protection of data against unauthorized access or corruption when transmitted over the network 110. Encryption can be performed by one or more encryption algorithms, processes, and standards to encrypt the data sent over the network in the form of packets. For example, encryption can be implemented using XML Encryption Syntax and Processing. The application profile can be in the form of an Extensible Markup Language (XML) file where one or more fields can be encrypted before transmission and decrypted at the recipient end to convert the message back into plain text/original form. In some embodiments, the application logic can also be encrypted so as prevent other entities from accessing the application logic in plaintext. In some embodiments, techniques such as digital signature can be used to assure authenticity, integrity, non-repudiation and notarization of the application profile and application logic. In some embodiments, encryption can be implemented using hardware security module (HSM) that are trusted physical devices that provide data protection by generating keys, encrypting, and decrypting data, and creating and verifying digital signatures.

In some embodiments, the CU 140 of the hybrid quantum computer 130 receives the request for executing an application that was generated and transmitted by the client device 120. After receiving the request, the CU 140 can use appropriate decryption techniques to decrypt and obtain the application logic and the application profile in unencrypted form.

In some embodiments, the CU 140 can be the resource manager of the hybrid quantum computer 130. The CU 140 can use the application profile to select resources of the hybrid computer 130 based on the application requirements specified by the application profile for the execution of the application logic. For example, assume that an application profile specifies that the minimum number of qubits needed to run the application is 24. Further assuming that the dilution refrigerator 160-1 have 16 qubits and dilution refrigerator 160-2 have 36 qubits, the CU 140 will select 24 qubits from the dilution refrigerator 160-2 and assign it to the application.

Due to the hybrid nature of the quantum computer 130, the quantum computer 130 can include multiple redundant resources where each of the resources can perform similar tasks. These redundant resources can differ from each other based on their make, model, supplier, efficiency, geographical location etc. In some embodiments, the application profile can specify the resources along with the along with one or more characteristics of the resource (for e.g., make, model, supplier, efficiency, geographical location). In such embodiments, even CU 140 can select the resources based on the specified characteristics. For example, the quantum computer 130 can include multiple input signal generators that can differ in its make, model and performance. The application profile can either specify an input signal generator with a particular make and/or model or an input signal generator with a minimum threshold for performance. As for another example, different cryo-controllers of the quantum computer 130 can be characterized by their performances along with its make and model.

In some embodiments, CU 140 can validate the application profile based on the available resources of the hybrid quantum computer 130. For example, if the application profile specifies one or more resources that are not available in the hybrid quantum computer 130, the CU 140 can invalidate the application profile thereby also cancelling the request for executing the application. For example, if the application profile specifies that the minimum number of qubits needed to run the application is 24, whereas the hybrid computer has only 16 qubits, the CU 140 can invalidate the application profile and prevent the application to be executed on the hybrid quantum computer 130. In some embodiments, the CU 140 can notify the user of the client device 110 after invalidating the application profile and the request for executing the application by sending a cancellation report back to the client device 110. The cancellation report can include a list of one or more resources from the application profile based on which the CU 140 invalidated the application profile.

In some embodiments, CU 140 can use the application profile to select resources other than the qubits of the dilution refrigerators 160-1 and 160-2 or the QPU 150. For example, assume that the application profile specifies that the minimum number of qubits needed to run the application is 24. However, due to prior requests for execution from the same or different client devices 110, the qubits of the dilution refrigerators 160-1 and 160-2 are already allocated to other applications. In such situations, the CU 140 can decide to execute the application using one or more computers of the CU 140. In such embodiments, the application profile can specify the permissions needed by the CU 140 to make such decisions. In such situations, CU 140 can estimate the time needed to execute the application using one or more computers of the CU 140 and the QPU 150. The CU 140 can use the estimated time to decide whether to wait for the availability of qubits or execute the application using one or more computers of the CU 140.

In some embodiments, the CU 140 checks the qubit parameters of the target hardware against the application profile and makes any required adjustments to the target hardware. For example, the application profile may require certain connectivity between qubits and the target hardware may have configurable connectivity. For example, the CU 140 can adjust the connectivity, the type of hardware that is processing the qubit circuits, select and adjust the different ways the results are processed from executing the qubits.

For the subsequent descriptions, it is assumed that the CU 140 validates the requirements specified by the application profile and decides to use the QPU 150 and the qubits of the dilution refrigerators 160-1 and 160-2 for executing the application logic.

In some embodiments, the CU 140 can notify the user of the client device 110 after validating the application profile. The validation report can include information regarding the allocated resources, the estimated time of execution of the application, the estimated duration of execution of the application, and one or more parameters as defined by the system designer or as requested by the client device 110. For example, the CU 140 can use a simulation tool that can simulate the qubits circuits being used in the application logic to determine the estimated duration of execution of the application using one or more runtime parameters. In some embodiments, the simulation tool can also use a performance profile indicating the performance characteristics for the types of qubits. The performance profile of the qubits can be provided by the client device 120 or it can be generated by the hybrid quantum computer 130 based on prior operations performed by the CU 140 or the QPU 150.

In some embodiments, the CU 140 is configured to transform the application logic into instructions that are executable by a quantum computer (for brevity, referred to as qubit logic in this specification) so that the application can be executed using the qubits of the dilution refrigerators 160-1 and 160-2 or the QPU 150. For example, the CU 140 can encode application data into quantum states and generate a quantum circuit to processes the quantum states to generate a state with the highest probability as an output.

In some embodiments, the CU 140 after transforming the application logic into qubit logic, can encrypt the qubit logic using one or more encryption techniques (e.g., by using an HSM 145 that can implement encryption algorithms such as Kyber, Dilithium, Falcon or Sphincs) to generate an encrypted form of the qubit logic. The CU 140 can then transmit the encrypted qubit logic to the QPU 150. In embodiments, where there are multiple QPU 150, the CU 140 selects one or more QPU 150 and transmits the encrypted qubit logic to the selected QPUs.

In some embodiments, after receiving the encrypted form of the qubit logic, the QPU 150 can use appropriate decryption techniques (e.g., by using an HSM 155) to decrypt the encrypted qubit logic to obtain the qubit logic in a form that can be executed by the QPU 150 and the qubits of the dilution refrigerators 160-1 and 160-2. In some embodiments, the QPU 150 can further encrypt the qubit logic so that the dilution refrigerators that are used for computing the output are the only ones to have access to the qubit logic. For example, if the QPU 150 uses qubits from dilution refrigerator 160-2 for processing the qubit logic, the QPU 150 can use HSM 155 to encrypt the qubit logic. The dilution refrigerator 160-2 can then use HSM 167 to decrypt the encrypted qubit logic before processing the qubit logic using its qubits.

In some embodiments, the qubit logic is executed by the QPU 150 using the qubits of the dilution refrigerators 160-1 and 160-2 to generate an output. The output can be a quantum output for e.g., a state with the highest probability. In some embodiments, the output is transmitted by the QPU 150 to the CU 140. The CU 140 can transform the output back into a logic that is understandable by the user of the client device 120. The CU 140 can transmit the output to the client device 120 where the output is presented to the user of the client device 120.

In some embodiments, the QPU 150 can encrypt the output using one or more encryption techniques such as by using the HSM 155 prior to transmitting the output to the CU 140. In such embodiments the CU 140 can decrypt the encrypted output using the appropriate decryption techniques. For example, the CU 140 can decrypt the encrypted output by using the HSM 145.

In some embodiments, the QPU 150 can transform the output into the logic that is understandable by the user of the client device 120 and transmit the output to the client device 120. In other embodiments, the QPU 150 can transmit the output to the client device 120 where the client device 120 can transform the output into the user understandable logic before presenting it to the user of the client device 120.

Figure 2:
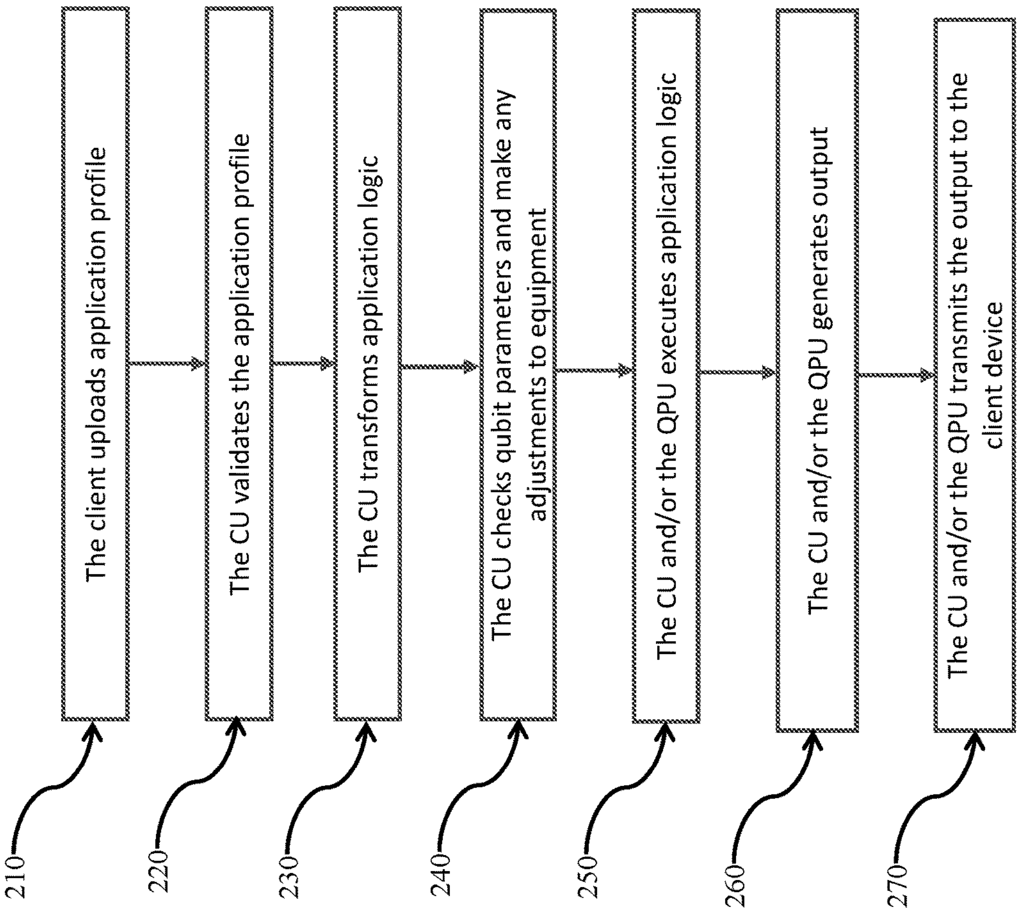
FIG. 2 is a flow diagram of an example process of using an application profile according to embodiments of the present disclosure.

FIG. 2 is a flow diagram that illustrates an example process 200 for using an application profile for executing an application and/or a process on a quantum computer. Operations of the process 200 can be implemented, for example, by the components of the environment 100 including the client device 120, the network 110, and the hybrid quantum computer 130.

The client device 120 uploads the application profile (210). For example, the client device 120 wishes to execute an application on a quantum computer. To execute the application, the client device 110 can generate and transmit a request for executing an application on a quantum computer. The request can be transmitted over the network 110 to the hybrid quantum computer 130. The request can include application logic, which is a set of instructions, modules, or procedures, that allow for a certain type of computing operation. The application logic can also include application data required for the computing operation. The request can include an application profile that is specific to the application logic. The application profile can include a list of one or more computing/resource requirements, including quantum computing resources needed to execute the application logic.

The CU 140 validates the application profile (220). For example, CU 140 can validate the application profile based on the available resources of the hybrid quantum computer 130. For example, if the application profile specifies one or more resources that are available in the hybrid quantum computer 130, the CU 140 can validate the application profile thereby allowing the request for executing the application for further processing. However, if the application profile specifies one or more resources that are not available in the hybrid quantum computer 130, the CU 140 can invalidate the application profile thereby also cancelling the request for executing the application. After invalidating an application profile and denying the request for executing the application on the hybrid quantum computer 130, the CU 140 can notify the user of the client device 120 by sending a cancellation report to the client device 120. The cancellation report can include a list of one or more resources from the application profile based on which the CU 140 invalidated the application profile.

The CU 140 transforms the application logic (230). For example, after validating the application profile, the CU 140 can transform the application logic into qubit logic so that the application can be executed using the qubits of the dilution refrigerators 160-1 and 160-2 or the QPU 150. For example, the CU 140 can encode application data into quantum states and generate a quantum circuit to processes the quantum states to generate a state with the highest probability as an output.

The CU 140 checks qubit parameters and makes any adjustments to equipment (240). For example, the application profile may require certain connectivity between qubits and the target hardware may have configurable connectivity. For example, the CU 140 can adjust the connectivity, the type of hardware that is processing the qubit circuits, select and adjust the different ways the results are processed from executing the qubits.

The CU 140 and/or the QPU 150 executes application logic (250). For example, based upon the application logic, application profile and resource allocation, the QPU 150 can execute the qubit logic using the qubits of the dilution refrigerators 160-1 and 160-2 to generate an output (260). In some embodiments, only a portion of the application logic can be converted to qubit logic. In such embodiments, the CU 140 can execute the portion of application logic that was not converted to qubit logic and the QPU 150 can execute the other portion of the application logic that was converted to qubit logic. In such embodiments, the CU 140 and the QPU 150 can either combine or share their respective outputs with each other. To combine and/or share the outputs, the CU 140 can either convert its output into a format understandable by the QPU 150 or vice-versa. In some embodiments, the output can be a quantum output for, e.g., a state with the highest probability.

The CU 140 and/or the QPU 150 transmits the output to the client device 120 (270). For example, the output is transmitted by the QPU 150 to the CU 140. The CU 140 can transform the output back into a logic that is understandable by the user of the client device 120. The CU 140 can transmit the output to the client device 120 where the output is presented to the user of the client device 120. In some embodiments, the QPU 150 can transform the output into the logic that is understandable by the user of the client device 120 and transmit the output to the client device 120. In other embodiments, the QPU 150 can transmit the output to the client device 120 where the client device 120 can transform the output into the user understandable logic before presenting it to the user of the client device 120.

Figure 3:
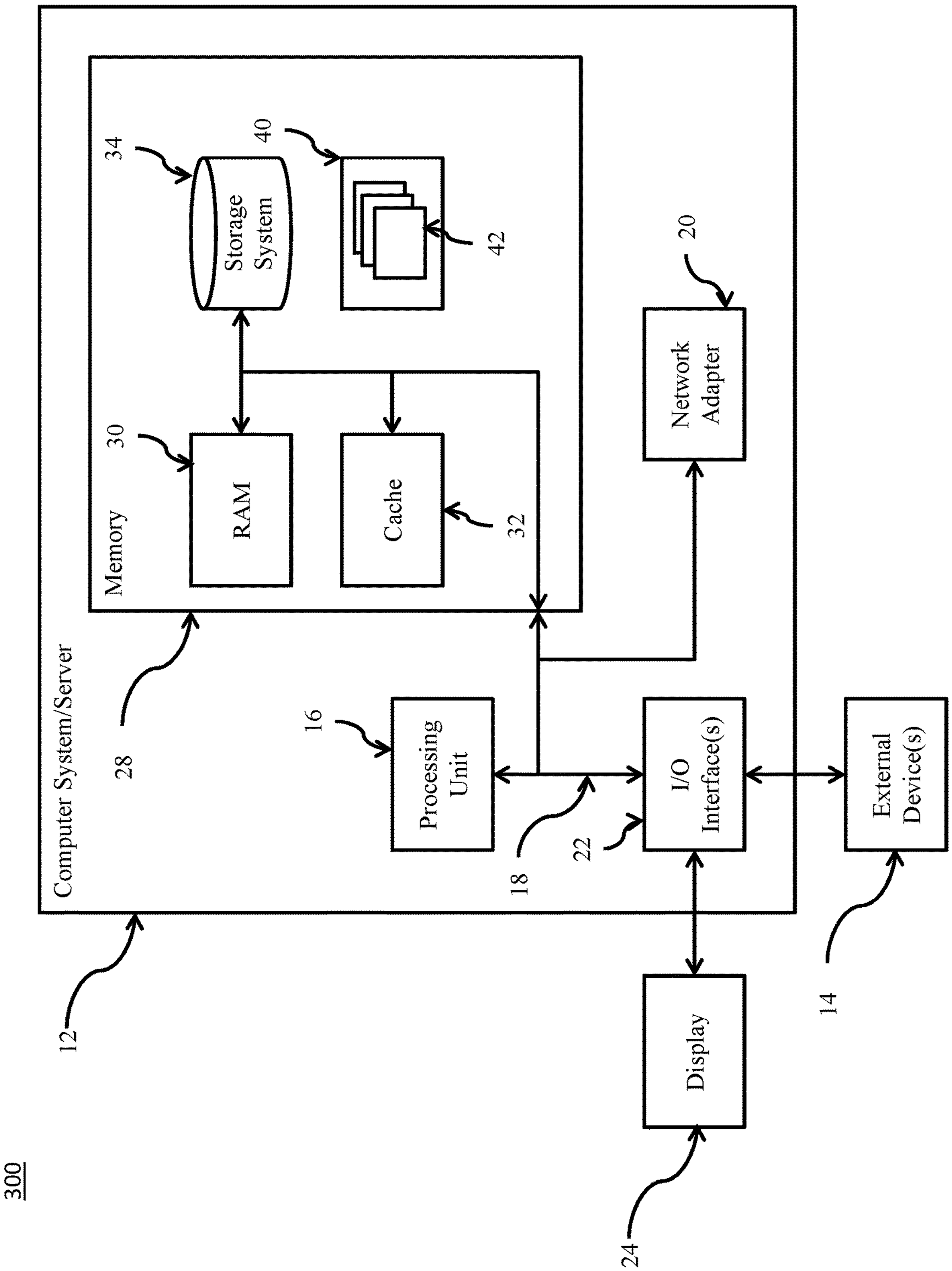
FIG. 3 depicts a computing node according to embodiments of the present disclosure.

FIG. 3 is a schematic of an example of a classical computing node. Computing node 300 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving from a requestor via a network interface an application execution request comprising application logic and an application profile comprising an indication of at least one quantum computing resource requirement;

comparing the at least one quantum computing resource requirement against a plurality of quantum processing units to confirm that the at least one quantum computing resource requirement is met by the plurality of quantum processing units;

selecting an execution set of the plurality of quantum processing units that collectively meet the at least one quantum computing resource requirement, quantum processing units of the execution set associated with at least one dilution refrigerator and a plurality of qubits;

validating that the execution set meets the at least one quantum computing resource requirement by determining whether the quantum processing units of the execution set that collectively meet the at least one quantum computing resource requirement are available;

comparing parameters of the at least one dilution refrigerator and the plurality of qubits of the execution set against the application profile;

adjusting at least one property of the execution set, the at least one property comprising one or more of a type of hardware processing the plurality of qubits, and connectivity between the plurality of qubits; and when the execution set is validated:

providing a validation message to the requestor, the validation message representing that the execution set meets the at least one quantum computing resource requirement, and assigning the application logic for execution on the execution set.

2. The method of claim 1, wherein assigning the application logic for execution comprises:

compiling the application logic into qubit logic.

3. The method of claim 2, further comprising:

encrypting the qubit logic;

transmitting the encrypted qubit logic to the execution set;

at the execution set, decrypting the encrypted qubit logic for execution.

4. The method of claim 1, wherein the application execution request further comprises application data.

5. The method of claim 1, wherein the application logic comprises a plurality of instructions or a plurality of software modules.

6. The method of claim 1, wherein the application profile further comprises a name, version, and/or description of the application logic.

7. The method of claim 6, wherein the application profile further comprises cryptographic information operative to decrypt the application logic.

8. The method of claim 7, wherein the application profile further comprises an indication to one or more characteristics of qubits including a kind of qubit to be used for execution, benchmark performance values of 1 or 2 qubit tests, and/or an estimate of processing time required by the at least one quantum computing resource to execute the qubit logic.

9. The method of claim 8, wherein the application profile further comprises an indication to one or more characteristics of the at least one quantum computing resource to execute the qubit logic, the said one or more characteristics of the at least one quantum computing resource comprising a make, a model and a performance of the at least one quantum computing resource.

10. The method of claim 1, wherein the at least one quantum computing resource requirement comprises a minimum number of dilution refrigerators, a minimum number of qubits, a qubit type, and/or a number of gates.

11. The method of claim 10, wherein a number of dilution refrigerators is scaled according to a number of qubits, and/or the number of gates.

12. The method of claim 11, wherein at least one of the plurality of quantum processing units executes the qubit logic using the number of qubits of at least one of the scaled number of dilution refrigerators.

13. The method of claim 1, wherein the application execution request is encrypted, the method further comprising: decrypting the application execution request.

14. The method of claim 1, wherein:
- the application profile comprises a connectivity requirement; and
- wherein selecting the execution set further comprises selecting the execution set of the plurality of processing units that collectively meet the connectivity requirement.

15. A system comprising:
- a network interface;
- at least one classical computing node;
- a plurality of quantum processing units, wherein the system is configured to perform a method comprising:
  - receiving from a requestor via a network interface an application execution request comprising application logic and an application profile comprising an indication of at least one quantum computing resource requirement;
  - comparing the at least one quantum computing resource requirement against a plurality of quantum processing units to confirm that the at least one quantum computing resource requirement is met by the plurality of quantum processing units;
  - selecting an execution set of the plurality of quantum processing units that collectively meet the at least one quantum computing resource requirement, quantum processing units of the execution set associated with at least one dilution refrigerator and a plurality of qubits;
  - validating that the execution set meets the at least one quantum computing resource requirement by determining whether the quantum processing units of the execution set that collectively meet the at least one quantum computing resource requirement are available;
  - comparing qubit parameters of the at least one dilution refrigerator and the plurality of qubits of the execution set against the application profile;
  - adjusting at least one property of the execution set, the at least one property comprising one or more of a type of hardware processing the plurality of qubits, and connectivity between the plurality of qubits; and
- when the execution set is validated:
  - providing a validation message to the requestor, the validation message representing that the execution set meets the at least one quantum computing resource requirement, and
  - assigning the application logic for execution on the execution set.

16. A computer program product comprising a computer readable storage medium having program instructions embodied therewith, the program instructions executable by one or more processors to cause the one or more processors to perform a method comprising:
- receiving from a requestor via a network interface an application execution request comprising application logic and an application profile comprising an indication of at least one quantum computing resource requirement;
- comparing the at least one quantum computing resource requirement against a plurality of quantum processing units to confirm that the at least one quantum computing resource requirement is met by the plurality of quantum processing units;
- selecting an execution set of the plurality of quantum processing units that collectively meet the at least one quantum computing resource requirement, quantum processing units of the execution set associated with at least one dilution refrigerator and a plurality of qubits;
- validating that the execution set meets the at least one quantum computing resource requirement by determining whether the quantum processing units of the execution set that collectively meet the at least one quantum computing resource requirement are available;
- comparing parameters of the at least one dilution refrigerator and the plurality of qubits of the execution set against the application profile;
- adjusting at least one property of the execution set, the at least one property comprising one or more of a type of hardware processing the plurality of qubits, and connectivity between the plurality of qubits; and
- when the execution set is validated:
  - providing a validation message to the requestor that the execution set meets the at least one quantum computing resource requirement, and
  - assigning the application logic for execution on the execution set.

* * * * *